Figure 1:
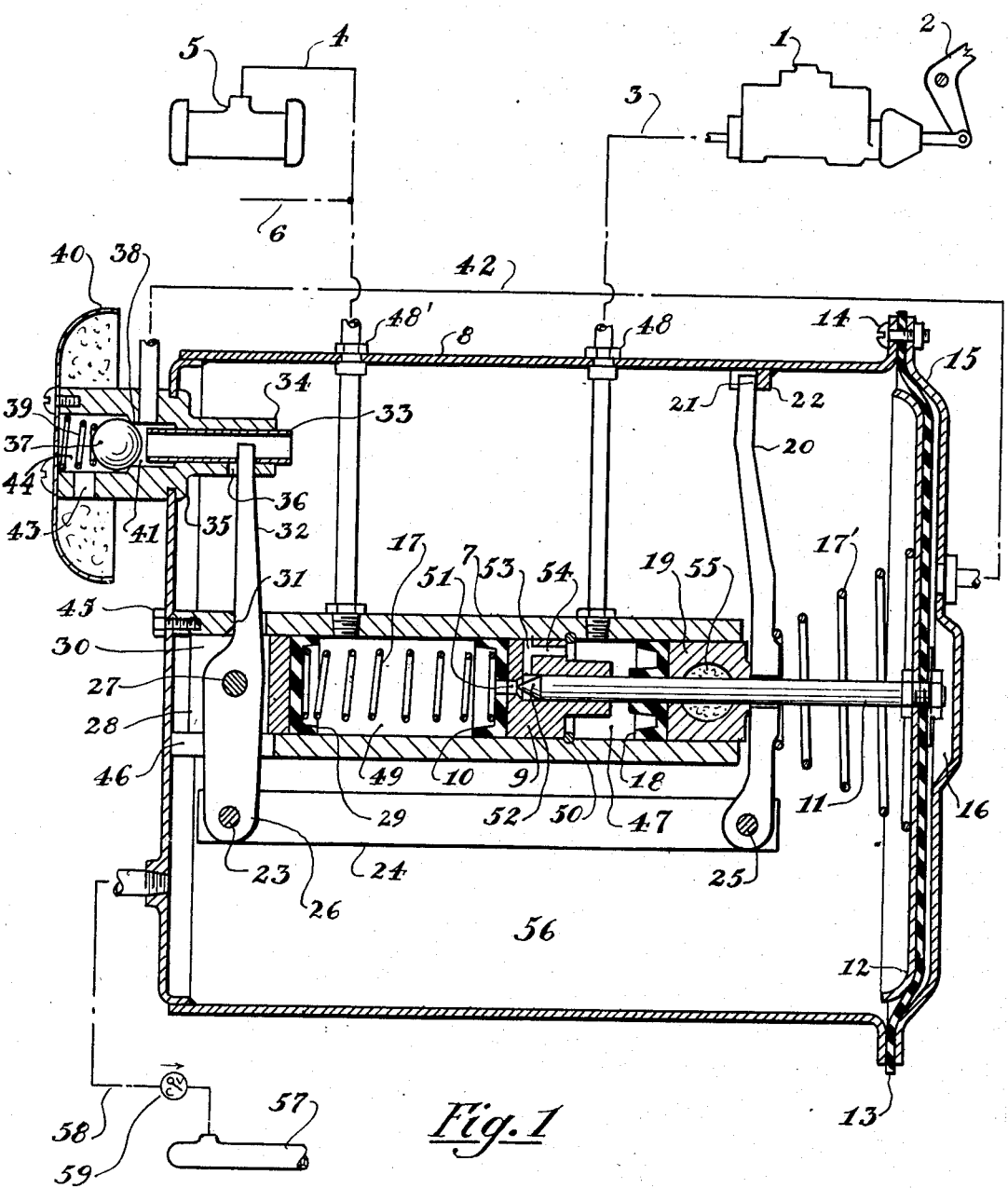

Jan. 12, 1943.   B. STELZER   2,308,460
HYDRAULIC BRAKE BOOSTER
Filed Oct. 10, 1941

INVENTOR.
Berteli Stelzer

Patented Jan. 12, 1943

2,308,460

UNITED STATES PATENT OFFICE 2,308,460

HYDRAULIC BRAKE BOOSTER

Berteli Stelzer, St. Petersburg, Fla., assignor to William Stelzer, Detroit, Mich.

Application October 10, 1941, Serial No. 414,464

5 Claims. (Cl. 188—152)

This invention relates to brake boosters and more particularly to a brake booster in conjunction with a conventional hydraulic braking system where the booster is operated by an expansible motor mechanism and controlled by the hydraulic pressures of the master cylinder and the wheel cylinders. This invention is related in its use and purpose to a construction disclosed in my Patent No. 2,260,490, issued October 28, 1941. The object of the invention is to provide a more simplified construction and this is accomplished by a novel arrangement of the essential booster parts so that they can also be used as control elements.

Another object is to minimize the number of parts and thereby reduce the chance for defects.

A further aim of the invention is to provide a booster cylinder which consists merely of an open tube and is sealed at both ends with conventional seals which are utilized to control the power to operate the booster. Another advantage is to use seals of uniform size and to transmit their actions by means of properly proportioned levers to oppose each other and to operate the control valve to direct the power to the expansible motor mechanism. A further purpose of the novel lever means, described hereinafter, is to provide a minimum movement of the control seals and a maximum travel of the control valve.

A still further object is to provide maximum reservoir space for the power means and to place all essential parts within for protection. Other advantages and aims will become apparent by inspection of the drawing, wherein:

The single figure is a cross sectional view of the booster and expansible motor mechanism with the conventional braking system shown diagrammatically.

Describing the invention now in detail, there is shown a conventional master cylinder 1 operated by a brake pedal 2 to produce a hydraulic pressure in the primary line 3 and which ordinarily is in communication with the secondary or high pressure line 4 leading to the wheel cylinders 5 of which there are usually four but only one is shown in order not to encumber the drawing. Line 6 thereby indicates the connection to the other wheel cylinders. Between lines 3 and 4 the booster unit is interposed and this merely consists of a hydraulic booster cylinder 7 secured to the housing 8 of the expansible motor mechanism. Cylinder 7 merely consists of a tube which is open at both ends and in which slides a piston 9 provided with a seal 10 and slidably engaged by a piston rod 11 to which is rigidly secured the diaphragm piston 12 and diaphragm 13 of the expansible motor mechanism. The diaphragm 13 is secured to housing 8 with bolts 14 and the cylinder cover 15 which forms the chamber 16 into which fluid pressure is applied when the expansible motor mechanism is operated.

The booster unit is shown in the "off" position and urged into this position by return springs 17 and 17'. The booster cylinder at one end has a seal 18 and a sliding sleeve 19 through which the piston rod 11 extends and which engages a lever 20 pivotally anchored at 21 by an abutment 22 secured to housing 8. The other end of the lever 20 is provided with a pin 25 and engages connecting links 24 (of which only one is shown) connected at the other end to a pin 23 extending through a lever 26 which is pivotally connected at 27 by means of a pin extending through to piston 28 provided with a seal 29 which is held in place by spring 17. Piston 28 has a slot 30 to connect lever 26 which engages cylinder 7 at 31. An extension 32 extending from lever 26 is adapted to operate sleeve 33 which slides into valve housing 34 secured to housing 8 at 35. A hole 36 in housing 34 is of such size as to serve as a stop for extension 32 to obtain the desired valve travel. The valve has a ball 37 seated on valve seat 38 by the pressure of a spring 39 to close off the supply of air from the atmosphere for which an air cleaner 40 is provided. The valve housing is bored out to provide a chamber 41 to which leads a fluid passage 42 from chamber 16. A passage 43 serves to provide communication between the atmosphere and chamber 44.

The booster cylinder 7 is secured to the housing 8 by means of bolts 45. A slot 46 in the booster cylinder serves to provide clearance for lever 26. The primary line 3 leads through housing 8 to the primary pressure chamber 47, whereby 48 may indicate a grommet fitting or seal to prevent air from entering into the expansible motor mechanism around line 3. Line 4 is connected in a like manner to the secondary chamber 49 and has a fitting 48'.

To hold piston 9 in the proper position when the booster mechanism is in the "off" position I provide a snap ring 50. This ring is so positioned that in the "off" position a passage is opened between chamber 47 and chamber 49. For this passage I provide an opening 51 which serves as a valve seat for piston rod 11 which has a point 52 to engage piston 9 by seating on the valve seat. The passage is continued by holes 53 and 54. To keep piston rod 11 wetted and clean a chamber 55 in sleeve 19 houses a wick saturated with brake fluid.

The housing 8 of the expansible motor mechanism forms a vacuum reservoir chamber 56 which is in communication with the intake manifold or other source of vacuum or power 57 through a vacuum line 58 into which a check valve 59 is interposed.

Having described the construction of the novel braking system I shall now describe its operation. To simplify the description I divide the system into a primary or low pressure circuit and a secondary or high pressure circuit. The primary circuit includes the fluid under line pressure in the master cylinder, the primary line 3, and chamber 47 of the hydraulic brake booster. The secondary circuit includes the fluid in the wheel cylinders 5, the pressure line 4 and chamber 49 of the hydraulic brake booster.

In the "off" position, as shown on the drawing, the primary circuit and the secondary circuit communicate and therefore have the same hydraulic pressure. The object of the hydraulic booster is to augment the pressure of the primary circuit to produce a secondary or higher pressure level in the secondary circuit which operates the wheel cylinders.

Assuming now that the booster and braking system is in the "off" position as shown on the drawing and that the operator depresses brake pedal 2 to apply the brakes, a pressure is produced in the master cylinder 1 and therefore in the primary circuit 3. This pressure is communicated to chamber 47, through passages 54 and 53, past piston rod 52 and through passage 51 to the secondary circuit which consists of chamber 49, line 4 and wheel cylinders 5. Thus wheel cylinders 5 apply the brake shoes to the brake drum. Since the effort to expand the brake shoes before they contact the drum is small, the fluid pressure is not sufficient to engage the valves and to apply power as spring 17' has sufficient stiffness to oppose sleeve 19 on which the primary pressure acts. As the brake shoes come in contact with the brake drum and the operator continues to depress the brake pedal the resistance, and consequently the hydraulic pressure, increases, whereby sleeve 19 and seal 18 overcome spring 17' and move lever 20 which is pivotally anchored. Lever 20 through links 24 moves lever 26 which is pivoted at 31, thereby moving piston 28 to decrease the volume of chamber 49. The movement of piston 28 is a fraction of the movement of sleeve 19 so that when the pressure in chamber 47 and 49 is the same, the sleeve 19 has no difficulty to overpower piston 28. As lever 26 moves about point 31 extension 32 advances sleeve 33 towards ball 37 until it comes in contact with it whereby communication between the source of power or, supply of vacuum from manifold 57 and chamber 56 is shut off from line 42 and chamber 16 of the expansible motor mechanism. At this stage a new resistance is introduced in the form of spring 39 so that the pressure of the primary circuit must be increased substantially before power is applied. This spring 39 has the additional purpose to provide the desired calibration for the point of application of the power whereby spring 17' is merely of sufficient strength to return the piston 12 and diaphragm 13 of the expansible motor mechanism into the "off" position. Thus the stiffness of spring 39 in addition to spring 17' determines the point where power is applied. When the brake shoes are well in contact with the brake drum and the effort to operate the master cylinder has reached a point where the help of the booster becomes desirable, spring 39 yields and permits further movement of levers 20 and 26, unseating ball 37 from valve seat 38, admitting air pressure from the atmosphere through air cleaner 40, passage 43 and chamber 44 into chamber 41, line 42, and chamber 16 of the expansible motor mechanism. The air admitted to chamber 16 moves diaphragm piston 12 and with it piston rod 11 until the latter seats on piston 9, shutting off communication between chamber 47 and chamber 49 by closing passage 51. Thus the operation of the control valve 37 by the pressure of the primary circuit depends on the resistance of springs 17', 39 and 17 whereby the latter helps to open the valve to admit power and springs 39 and 17 urge said valve to close and thereby to shut off the supply of power to the expansible motor mechanism. After piston rod 11 has seated itself on the booster piston 9, the piston 9, piston rod 11, and diaphragm piston 12 move in unison to reduce the volume of chamber 49, being helped by the primary pressure in chamber 47, which acts on piston 9, whereby the hydraulic pressure in the secondary circuit is increased and is greater than the pressure in the primary circuit. The pressure in the secondary circuit is the sum of the pressure in the primary circuit and the additional pressure produced by the action of the expansible motor mechanism.

The arrangement of the control elements is such that the boosted hydraulic pressure in the secondary circuit is a predetermined multiple of the pressure in the primary circuit. Thus, when the boosted pressure has reached the pre-determined multiple of the primary pressure, the control valve is automatically closed, and if the boosted pressure is greater than the predetermined multiple of the primary pressure, the supply of power to the expansible motor mechanism is not only shut off, but power is released to decrease the help of the expansible motor mechanism until the desired pressure is reached. Assuming now that the pressure in the secondary circuit has reached the predetermined multiple of the primary circuit while the operator maintains the primary pressure by pressing on the brake pedal, the action of sleeve 19 counterbalances the action of piston 28. Due to the lever ratios of lever 20 and 26 a smaller pressure is required on sleeve 19 to oppose the pressure on piston 28 whereby the ratio and length of levers 20 and 26 are so proportioned that their overall ratio is approximately equal to the booster ratio (whereby I neglect the difference due to friction and the action of the various springs which at higher operating pressures is negligible). As sleeve 19 and piston 28 are balanced their position is indifferent so that a small force is able to move the levers in either direction. Therefore ball 37 is forced to seat on valve seat 38 by the pressure of the coil spring 39 whereby the supply of air pressure to the expansible motor mechanism is shut off. This might be called the "holding position" where the brake shoes are applied, but the brake pedal is not depressed further.

Assuming that too much power has been admitted to the expansible motor mechanism, i. e., to chamber 16, then the boosted pressure in chamber 49 is greater than the predetermined multiple which is depending on the booster ratio and, consequently, piston 28 moves to increase chamber 49 and overpowers sleeve 19 through the transmission of the levers 26 and 20, consequently, extension 32 pivoting about point 31 moves to permit ball 37 to seat and to separate sleeve 33 from ball 37 to open up a passage between chamber 16 and chamber 56. Thereby air pressure is permitted to escape from chamber 16 through passage 42 and through sleeve 33 into reservoir chamber 56 so that the pressure of the piston 12 acting on piston 9 is reduced; consequently the secondary pressure in chamber 49 is reduced. As soon as it is reduced sufficiently where it is overcome again by primary pressure acting on sleeve 19, sleeve 33 is moved again to seat on ball 37 so that the booster is in the "holding position."

When the operator releases the foot pressure on the brake pedal the pressure in master cylinder 1, and consequently in the primary circuit, is reduced thereby the pressure on sleeve 19 is relieved so that spring 17', spring 39, as well as the fluid pressure in chamber 49 act jointly to turn lever 26 about pivot 31 whereby extension 32 moves sleeve 33 away from ball 37, opening the passage so that the air under pressure in chamber 16 may escape through passage 42, chamber 41, and sleeve 33 into reservoir chamber 56, to be evacuated from there through vacuum line 58 and intake manifold 57. As the air from chamber 16 escapes spring 17' in unison with spring 17 pushes the diaphragm piston 12 into the "off" position. Before the diaphragm piston 12 has reached the "off" position, piston 9 is stopped by stop ring 50 so that when the diaphragm piston 2 is moved further to its "off" position a fluid passage is opened through passages 54, 53 and 51 to establish communication between the primary circuit and the secondary circuit. Therefore fluid from chamber 49 is forced through passage 51 to return to the master cylinder 1 until the brake shoes are urged into their released position by the brake shoe return springs which are standard elements of conventional brakes and are therefore not shown on the drawing. The braking system is now again in the "off" position as illustrated on the drawing.

To simplify the description of the booster I have called piston 28 a control piston but it is apparent that this part, as well as sleeve 19 and seal 18 are essential parts of the booster cylinder because a hydraulic cylinder in its essential parts consists of a cylinder, a piston, a piston rod, as well as convenient parts such as a cylinder head and stuffing box to close off the ends to complete the cylinder chambers. Thus, control piston 28 may be considered as a cylinder head which I am using to measure the boosted pressure. Seal 18 and sleeve 19 may be considered as a stuffing box which is used in the novel construction to measure the primary pressure. A great simplification of construction is obtained by making the seals 29, 10 and 18 of the same diameter. It is a particular advantage of the transmitting control levers 26 and 20 that their effective ratios may be changed without any radical alteration of the construction. It is particularly easy to change the position of the point of contact 31 to a small extent by removal of the metal from cylinder 7.

It is apparent that the novel booster in its principle can be constructed in many ways different from that shown, therefore, I do not wish to limit the scope of the invention to the particular embodiment shown by way of illustration, or otherwise than by the terms of the appended claims.

I claim:

1. In a braking system for automotive vehicles having a hydraulic master cylinder operated by the operator and wheel cylinders to apply the brake shoes, in combination, a hydraulic brake booster consisting of a cylinder, a booster piston therein to divide said cylinder into a primary or low pressure chamber, and a secondary or high pressure chamber, fluid pressure transmitting means from said master cylinder to said primary pressure chamber, fluid pressure transmitting means from said secondary pressure chamber to said wheel cylinders, an expansible motor mechanism to operate said booster piston, a source of power to operate said expansible motor mechanism, valve means to direct power to and from said expansible motor mechanism, a control piston in said primary pressure chamber responsive to the hydraulic pressure produced by said master cylinder, a control piston in said secondary pressure chamber responsive to the boosted hydraulic pressure, mechanical lever means to transmit the force produced by one control piston to oppose the other, said lever means being so proportioned that the forces of the control pistons are balanced when the desired booster ratio is obtained, said valve means being responsive to the excursions of said lever means whereby an excursion due to the yielding of the control piston in said secondary pressure chamber to the control piston in said primary pressure chamber urges said valve to direct power from said source of power to said expansible motor mechanism to increase the hydraulic pressure in said wheel cylinders, and where an excursion due to yielding of the piston in said primary pressure chamber to the control piston in said secondary pressure chamber urges said valve means to decrease the power directed to said expansible motor mechanism, and means to provide passage of hydraulic fluid from said secondary chamber to said primary chamber when said booster is in the "off" position and the brake pedal released.

2. In a braking system for automotive vehicles having a hydraulic master cylinder operated by the operator and wheel cylinders to apply the brakes, in combination, a hydraulic booster cylinder, a booster piston in said booster cylinder dividing said booster cylinder into a primary pressure chamber and a secondary pressure chamber, hydraulic fluid pressure transmitting means from said primary chamber to said master cylinder, hydraulic fluid pressure transmitting means from said secondary pressure chamber to said wheel cylinders, an expansible motor mechanism to operate said booster piston, a source of power to operate said expansible motor mechanism, valve means to control the amount of power from said source of power directed to said expansible motor mechanism, means responsive to the hydraulic pressure in said primary chamber, means responsive to the hydraulic pressure in said secondary chamber, lever means to transmit the force produced by said means responsive to the hydraulic pressure in said primary chamber to oppose said means responsive to the hydraulic pressure in said secondary chamber, and means responsive to the excursions of aid lever means to operate said valve means.

3. In a hydraulic braking system for automotive vehicles having a hydraulic master cylinder operated by the operator, wheel cylinders to apply the brake shoes, and fluid pressure transmitting means from said master to said wheel cylinders, in combination, a hydraulic booster interposed in said fluid pressure transmitting means which divides said braking system into a primary circuit whose pressure is produced by said master cylinder, and a secondary circuit whose pressure is boosted by said hydraulic booster and is in communication with said wheel cylinders, an expansible motor mechanism to operate said hydraulic booster, a source of power to operate said expansible motor mechanism, valve means to direct power to and from said expansible motor mechanism, balancing lever means responsive to the pressure of said primary circuit and said secondary circuit to weight said pressures and to operate said valve means to direct more power to said expansible motor mechanism when the secondary pressure is too low, and to reduce the power admitted to said expansible motor mechanism when the pressure of said secondary circuit is too high, means to provide passage of fluid from said secondary circuit to said primary circuit when the booster is in the "off" position, said booster, said expansible motor mechanism, said valve means and said lever means forming a single, self-contained unit.

4. In a hydraulic braking system for automotive vehicles having a master cylinder operated by the operator, wheel cylinders to apply the brake shoes and a fluid pressure transmitting line from said master cylinder to said wheel cylinders, in combination, a hydraulic booster interposed into said fluid pressure transmitting line dividing said hydraulic braking system into a primary circuit whose pressure is produced by said master cylinder and a secondary circuit in communication with said wheel cylinders, an expansible motor mechanism to operate said hydraulic booster, a source of power to operate said expansible motor mechanism, valve means to direct power to and from said expansible motor mechanism, said hydraulic booster consisting of a cylinder and a booster piston therein said piston dividing said cylinder into a primary circuit chamber and a secondary circuit chamber, a piston rod operated by said expansible motor mechanism to move said booster piston, a slidable steal between said piston rod and said cylinder to seal the primary circuit chamber, a seal slidable in said cylinder to seal said secondary circuit chamber, mechanical lever means responsive to the hydraulic pressure of the primary circuit acting on said seal that seals said primary circuit chamber urging said valve means to increase the power directed to said expansible motor mechanism, mechanical lever means responsive to the hydraulic pressure of the secondary circuit acting on said seal that seals said secondary circuit chamber urging said valve means to decrease the power directed to said expansible motor mechanism, and means to provide a hydraulic passage between the primary and the secondary circuit when said booster is in the "off" position.

5. In a hydraulic braking system for automotive vehicles having a master cylinder operated by the operator and wheel cylinders to apply the brake shoes, in combination, a hydraulic brake booster cylinder, a booster piston slidable in said hydraulic brake booster cylinder and acted upon by the hydraulic pressure produced by said master cylinder, an expansible motor mechanism to operate said piston to produce a higher pressure level for the operation of said wheel cylinders, fluid pressure transmitting means between said master cylinder and the low pressure side of said hydraulic brake booster cylinder, fluid pressure transmitting means between said wheel cylinders and the high pressure side of said hydraulic brake booster cylinder, a source of power to operate said expansible motor mechanism, a valve to direct power to and from said expansible motor mechanism, mechanical lever means responsive to the hydraulic pressure produced by said master cylinder to urge said valve to increase the power directed to said expansible motor mechanism, and mechanical lever means responsive to the hydraulic pressure in said wheel cylinders to urge said valve to decrease the power directed to said expansible motor mechanism, said lever means having a ratio giving the master cylinder pressure the advantage so that the opposing forces urging the operation of said valve are counteracted and balanced when the boosted hydraulic pressure in said wheel cylinders has reached the desired and pre-determined multiple of the hydraulic pressure produced by said master cylinder.

BERTELI STELZER.